United States Patent
Garten

(10) Patent No.: US 8,615,111 B2
(45) Date of Patent: Dec. 24, 2013

(54) METHOD AND APPARATUS FOR IMAGE DETECTION WITH UNDESIRED OBJECT REMOVAL

(75) Inventor: Haim Garten, Haifa (IL)

(73) Assignee: CSR Technology Inc., San Jose, CA (US)

( * ) Notice: Subject to any disclaimer, the term of this patent is extended or adjusted under 35 U.S.C. 154(b) by 457 days.

(21) Appl. No.: 12/756,937

(22) Filed: Apr. 8, 2010

(65) Prior Publication Data

US 2011/0103644 A1  May 5, 2011

Related U.S. Application Data

(60) Provisional application No. 61/256,768, filed on Oct. 30, 2009.

(51) Int. Cl.
*G06K 9/00* (2006.01)

(52) U.S. Cl.
USPC ........................................... 382/107

(58) Field of Classification Search
USPC ................. 382/103, 107, 112, 190, 275, 309; 358/3.26; 345/618, 629, 655
See application file for complete search history.

(56) References Cited

U.S. PATENT DOCUMENTS

| | | |
|---|---|---|
| 5,150,432 A | 9/1992 | Ueno et al. |
| 5,808,682 A | 9/1998 | Okunoki et al. |
| 7,088,396 B2* | 8/2006 | Fredlund et al. ......... 348/333.02 |
| 7,391,447 B2 | 6/2008 | Lee et al. |
| 7,433,588 B2 | 10/2008 | Oya |
| 8,111,300 B2* | 2/2012 | Hwang et al. ............... 348/222.1 |
| 2004/0095357 A1* | 5/2004 | Oh et al. ........................ 345/589 |
| 2005/0129324 A1* | 6/2005 | Lemke .......................... 382/254 |
| 2006/0078224 A1* | 4/2006 | Hirosawa ...................... 382/284 |
| 2006/0204037 A1* | 9/2006 | Watanabe et al. ............. 382/104 |
| 2007/0237506 A1* | 10/2007 | Minema et al. ................. 396/52 |
| 2008/0037869 A1* | 2/2008 | Zhou ............................. 382/173 |
| 2008/0187234 A1* | 8/2008 | Watanabe et al. ............. 382/254 |
| 2008/0316321 A1* | 12/2008 | Steinberg et al. .......... 348/208.1 |
| 2009/0102935 A1* | 4/2009 | Hung et al. ................ 348/222.1 |
| 2009/0231449 A1* | 9/2009 | Tzur et al. .................. 348/208.6 |
| 2009/0231464 A1* | 9/2009 | Nakamura ................. 348/229.1 |
| 2009/0284637 A1* | 11/2009 | Parulski et al. .......... 348/333.12 |
| 2009/0324103 A1* | 12/2009 | Gelfand et al. ............... 382/224 |
| 2010/0026839 A1* | 2/2010 | Border et al. .............. 348/231.2 |
| 2010/0119171 A1* | 5/2010 | Gobert ......................... 382/255 |
| 2010/0231738 A1* | 9/2010 | Border et al. .............. 348/222.1 |

* cited by examiner

*Primary Examiner* — Shervin Nakhjavan

(74) *Attorney, Agent, or Firm* — Frommer Lawrence & Haug LLP; John W. Branch

(57) ABSTRACT

A method and image detection device are provided for removal of undesired objects from image data. In one embodiment, a method includes detecting image data for a first frame, detecting image data for a second frame, and detecting motion of an undesired object based, at least in part, on image data for the first and second frames. Image data of the first frame may be replaced with image data of the second frame to generate corrected image data, wherein the undesired object is removed from the corrected image data. The corrected image data may be stored.

22 Claims, 4 Drawing Sheets

METHOD AND APPARATUS FOR IMAGE DETECTION WITH UNDESIRED OBJECT REMOVAL

CROSS-REFERENCE TO RELATED APPLICATION

This application claims the benefit of U.S. Provisional Application No. 61/256,768, filed on Oct. 30, 2009, which is hereby fully incorporated by reference.

FIELD OF THE INVENTION

The present invention relates in general to image detection and more particularly to removal of undesired objects during image detection.

BACKGROUND OF THE INVENTION

Frequently when capturing images of interesting objects that are generally static, such as a tourist attraction, moving objects may appear in front of the object being photographed. As a result, the object of interest may be obscured and/or partially covered by the moving object. In certain situations, removal of the moving objects may be desired to provide an unobstructed image of the interesting object. For example, a moving tourist in front of a tourist attraction, such as the White House, may obstruct captured image data of the attraction. Thus, there is a desire to correct for obstructions. Conventional systems and methods allow for correction of captured image data typically through the use of an image editing tool once image data has been collected. For example, Photoshop® is an image editing tool which allows for the removal of image data from an image file and replacement with additional image data. This tool, and image editing tools in general, is typically executed on a personal computer once image data has been captured. Post-processing of image data usually requires at least two images and storage of each image. Further, post-processing usually requires similar images to be captured. These conventional systems, however, do not allow for image correction to be performed using a device which captures the image data. Further, post-processing of image data can require a level of skill and familiarity with the image editing tool and the image editing in general. Many users, however, do not possess the ability to correct images to utilize image editing programs to correct image data. Further, conventional devices and methods for image detection do not allow for correction of image frames in real-time, or near-real-time, of undesired objects in captured image data.

Thus, there is a need in the art for a device and methods of correction of image data at the location of capture to allow for removal of one or more undesired objects, such as tourist removal, in captured image data. Further, in contrast to an offline editing tool for correction of image data which does not allow for capturing a scene again, there is a desire to provide for capturing image data when corrected image data is unsatisfactory to a user.

BRIEF SUMMARY OF THE INVENTION

Disclosed and claimed herein, are a device and methods for removal of undesired objects from image data. In one embodiment a method includes detecting image data for a first frame, detecting image data for a second frame, and detecting motion of an undesired object based, at least in part, on image data for the first and second frames. The method further includes replacing image data of the first frame with image data of the second frame to generate corrected image data, wherein the undesired object is removed from the corrected image data, and storing the corrected image data.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

One aspect of the present invention relates to removal of one or more undesired objects from captured image data by an image detection device. Removal of undesired objects as described herein can eliminate the need of post-processing, such as off-line processing of image data, by a user. As disclosed herein, a method and apparatus are provided for removal of undesired objects from image data including replacing image data of a first frame with image data of a second frame. In one embodiment, undesired objects may be detected based on movement of the objects detected within the one or more captured frames of image data. According to another embodiment, image data may be corrected based on one or more regions selected by a user of an imaging device.

In another embodiment, a device may be configured to detect one or more images and perform a correction based on comparison between the one or more images. In addition, the device may be configured to display one or more corrected images for a user to review. Processing of the captured image data by the device may allow for only corrected image data to be stored in memory of the device allowing for a reduced memory requirements in comparison to prior art methods of post-processing. In yet another embodiment, replacement regions may be displayed on the image detection device display for user selection of one or more corrected images.

DESCRIPTION OF THE EXEMPLARY EMBODIMENTS

Figure 1:
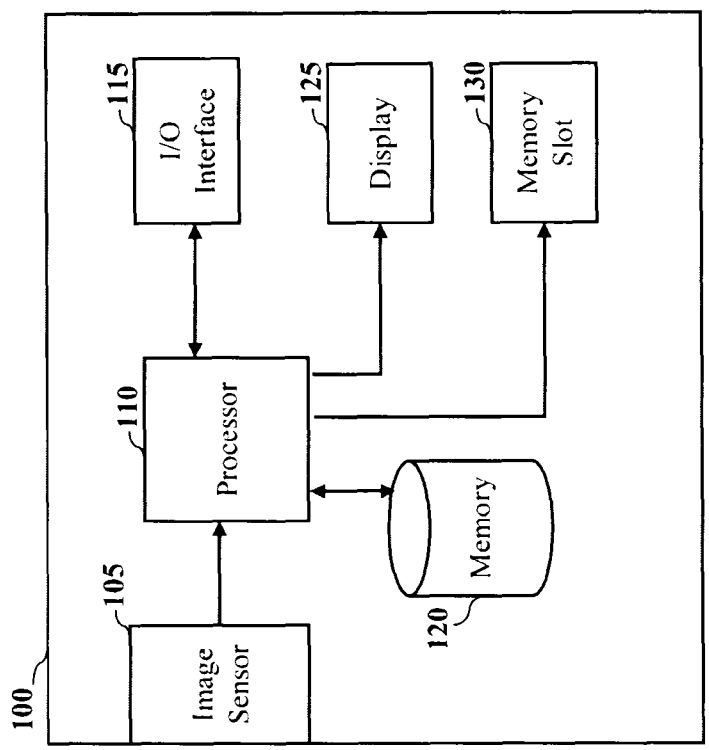
FIG. 1 depicts a simplified block diagram of a image detection device according to one embodiment of the invention.

FIG. 1 depicts a simplified block diagram of a device configured to provide removal of image objects according to one embodiment of the invention. Image sensor 105 of device 100 may be configured to detect image data for one or more frames. According to one embodiment, image sensor 105 relates to one of a charge coupled device (CCD) and complementary metal-oxide-semiconductor (CMOS) sensor. According to a further embodiment, image sensor 105 relates to one or more of a rolling shutter sensor and global shutter sensor. Device 100 includes processor 110 coupled to image sensor 105 and configured to process image data associated with one or more frames. Processor 110 may be configured to receive image data detected by image sensor 105 as input. Exemplary input to the system includes, but is not limited to, YUV422 and RGB image formats. Processor 110 may be configured to process image data for output via input/output (I/O) interface 115, display 125, storage in memory 120 and/or output to removable memory via memory slot 130. I/O interface 115 may include one or more control buttons, allow for touch screen functionality, zoom functions, etc. Image sensor 105, the processor 110, memory 120 and I/O 115 may be coupled to a bus that enables transfer of data between the various units of device 100.

Processor 110 of device 100 may be configured to provide removal of undesired objects based on image data detected by image sensor 105 to provide real-time digital image correction. In that fashion, image correction may not require post processing to remove certain objects. As will be described in more detail below with respect to FIG. 2, device 100 may be configured to perform a process including detecting motion of undesired objects based on image data detected for at least two frames. In one embodiment, removal of undesired object may relate to a "tourist removal" mode (TRM) or scene cleaner, wherein device 100 can capture two or more images associated with a particular image requested by the user.

Processor 110 may be configured to operate based on one or more instructions stored in memory 120, wherein memory 120 relates to one of ROM, RAM and non-volatile memory (NVM) memory. Executable instructions and/or data received by device 100 may be stored by memory 120. In addition, memory 120 may be configured to store captured image data, provide scratch pad memory and/or other functions typical of a memory. Processor 110 may be configured to perform a plurality of tasks that control the operation of device 100 as well as processing the image data. Although, a single processor is shown in FIG. 1, it should be appreciated that a co-processor may also be included in device 100, for example a processor for performing control functions and a digital signal processor for performing signal processing (not shown in FIG. 1).

Figure 2:
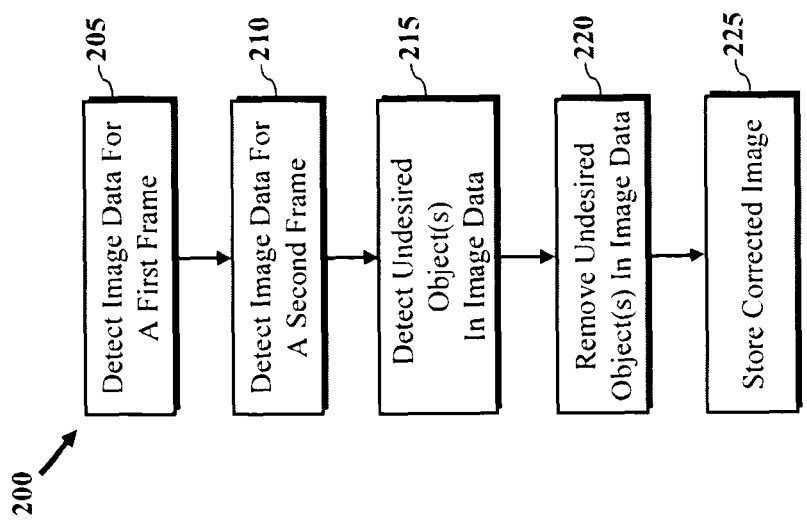
FIG. 2 depicts a process for removal of undesired objects in image data by an image detection device according to one embodiment of the invention.

Referring now to FIG. 2, a process is depicted for removal of undesired objects from image data by the device of FIG. 1 according to one embodiment of the invention. Process 200 may advantageously allow for image correction by an image capture device, such as the device of FIG. 1, such as "on the spot" correction. In that fashion, image data may be corrected without the need for storage of a plurality of images for later offline processing to correct for one or more undesired objects. In addition, process 200 eliminates the need to store a plurality of images for post processing or offline processing as correction may be performed by the imaging device on the spot. As a result, memory of the imaging device may be employed to capture additional images. According to one embodiment, process 200 may be initiated based on detection of user selection of a capture button of an imaging device in an undesired object removal mode (e.g., tourist removal mode (TRM)). Process 200 may be initiated by detecting image data for a first frame at block 205 and detecting image data for a second frame at block 210. According to one embodiment, image data detected at blocks 205 and 210 may be captured by an image sensor within a predetermined time period, such that the second image data is captured shortly following the detection of the first image. By way of example, based on detection of user selection of a capture button, the device may capture a first image, wait the predetermined time period, and capture the second image. Delay between capturing images between block 205 and 210 may be predefined based on manufacturer settings, such as one and one half seconds (1.5) seconds. According to one embodiment, based on motion detection by the imaging device, the delay between blocks 205 and 210 may be adjusted to account for motion of objects. In certain embodiments, capturing of image data and/or the duration between capturing images at blocks 205 and 210 may be based on one or more of the amount of movement detected in preview mode, light parameters, user adjustment of default settings, etc. The delay period may further be adjusted based on the means of supporting the device. For example, when a tripod is employed, the above delay may correspond to at least five seconds. Alternatively, when the device is employed for handheld operation, a shorter delay such as two seconds or less may be set for the delay period.

At block 215, motion of undesired objects in the image frame may be detected based on image data associated with the first and second frames. For example, the processor may be configured to perform motion estimation to determine one or more motion vectors associated with image date in the first and second frames. Detection of local motion regions may be determined by generating a difference image after image data for the first and second frames have been aligned to a single image that serves as a reference image. It should also be appreciated that motion regions may be determined by other comparisons of the image data, such as normalized correlation or other metrics between the first and second images. Using a threshold value for the difference image, each area where the pixels are above the threshold is assumed to be a region where motion takes place. The larger the difference above the threshold the more likely it is that there is motion. It should be noted that while the example herein discusses two images, a plurality of images may be used without departing from the spirit of the invention. The comparison may detect outliers and discard outliers in favor of an average of the other first areas and using them for the purpose of generation of the corrected image.

Based on the motion of detected objects, the processor may replace image data of the first frame with image data of the second frame at block 220. In certain embodiments, image data may be extracted from the first image and to replace image data of the second image to generate a correct image at block 220. Alternatively, or in combination, image data from a plurality of regions of each image may be employed to replace image data relative to the respective image. Image data replacement may be performed to replace unwanted or disturbing objects with image data associated with a background. According to one embodiment, image data for the background and/or the disturbing object can appear either in the first frame or in a second or subsequent frame. Thus, image data from a first frame can replace image data for a second frame, and vice versa. Replacement of image data may further be selected manually and/or automatically to optimize correction of the image data. Corrected image data may then be stored on the imaging device at block 225. As will be discussed in more detail below with respect to FIG. 4, the imaging device may display corrected image data for a user review prior to storage at block 225. Although not shown in FIG. 2, process 200 may include removal of intermediate image data from memory 120. It should also be appreciated that image data may be detected for at least one additional frame, and the image data of the first frame may be replaced with image data of the at least one additional frame to generate corrected image data and remove at least one additional undesired object from the corrected image data.

Figure 3:
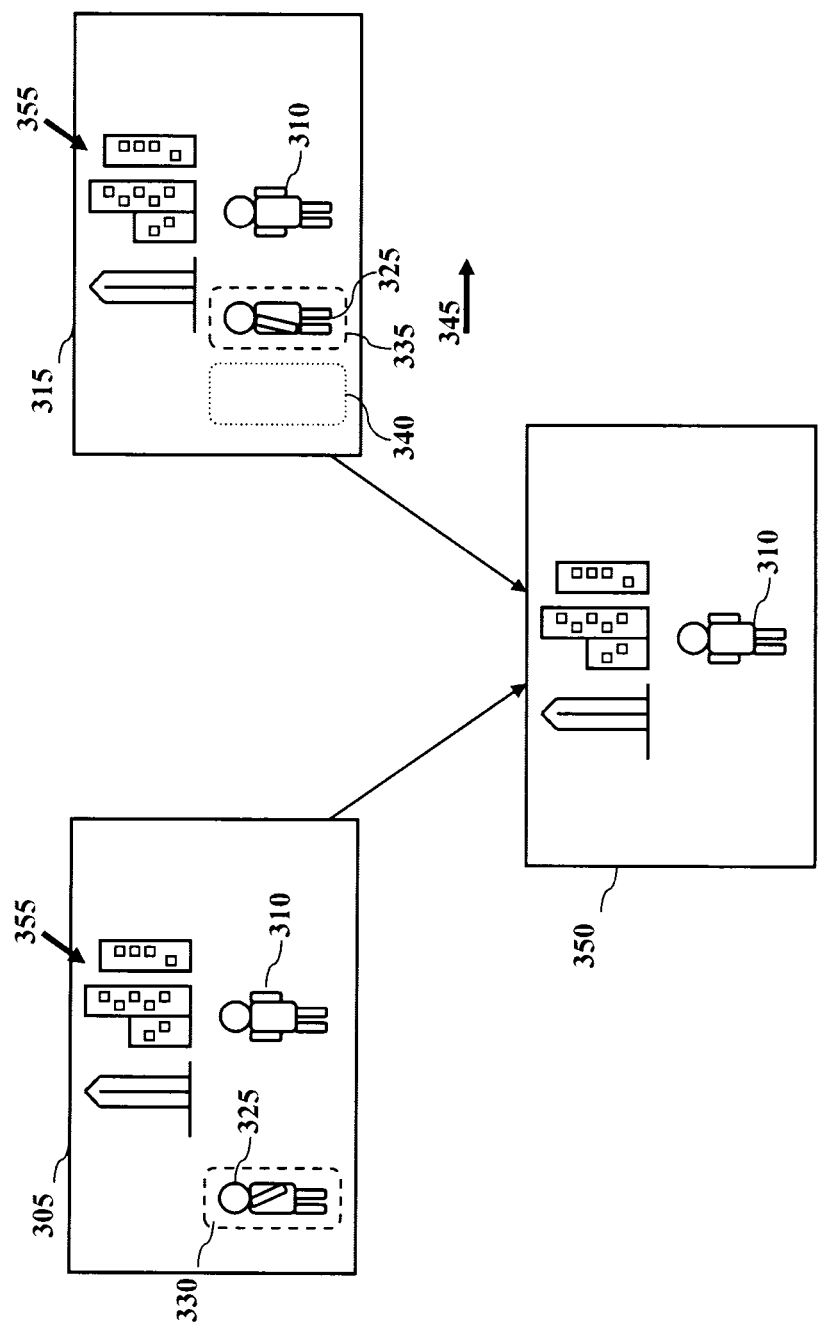
FIG. 3 depicts a graphical representation of corrected image data according to one embodiment of the invention.

Referring now to FIG. 3, a graphical representation is shown of removal of an undesired object according to one or more embodiments of the invention. First frame 305 is depicted including object 310 and undesired object 325. Second frame 315 is depicted including object 310 and undesired object 325. According to one embodiment of the invention, the device of FIG. 1 may be configured to detect one or more pixels associated with undesired object 325, shown as 330. Detection of the pixels may be associated with movement, shown by direction 345, of undesired object 325 in a displaced position relative to frames 305 and 315. Based on movement 345, undesired object may be associated with one or more pixels in frame 315, shown as 335. According to one embodiment of the invention, pixels associated with undesired object in frame 305 may be replaced with pixel data corresponding to frame 315, shown as 340. As a result, the device may be configured to generate a corrected image shown as 350 including object 310, wherein pixel data associated with the undesired object has been removed and replaced with pixel of a different frame.

Although, pixel data has been replaced in the first image, it may be appreciated that pixel data of frame 315 may be replaced with pixel data of frame 305 according to one embodiment. According to another embodiment, undesired pixels may be detected based on movement of undesired object which associated with a certain region of the image area, such as local motion. Further, motion of undesired object 325 may be determined based on a comparison of similar pixel data relative to frames 305 and 315. By way of example, similar background data, shown as 355, may be detected by a processor of the device and employed as a reference point for correction of image data.

According to another embodiment, it should be appreciated that removal of one undesired object as depicted in FIG. 3, or a plurality of undesired objects, may be based on a plurality of images captured by the imaging device. For example, a plurality of additional frames may be detected by the imaging device for detecting motion of one or more undesired objects and/or for replacing image data of a frame to generate corrected image data. In that fashion, a plurality of images (e.g., five images) may be employed to remove undesired objects and generate corrected image data. In certain embodiments, it may be preferable for the imaging device to capture a plurality of images, as the plurality of images may facilitate detection of static regions (e.g., by way of a median filter). As such, the imaging device may be configured to automatically capture a plurality of images based on detection of a user command to capture image data. It should also be appreciated that the imaging device may only rely on a portion of the images captured for the removal of one or more undesired objects. According to another embodiment, when a plurality of images is captured, each of the images may be aligned by a processor for detection of local motion and to compensate the user generated motion during handheld operation.

Figure 4:
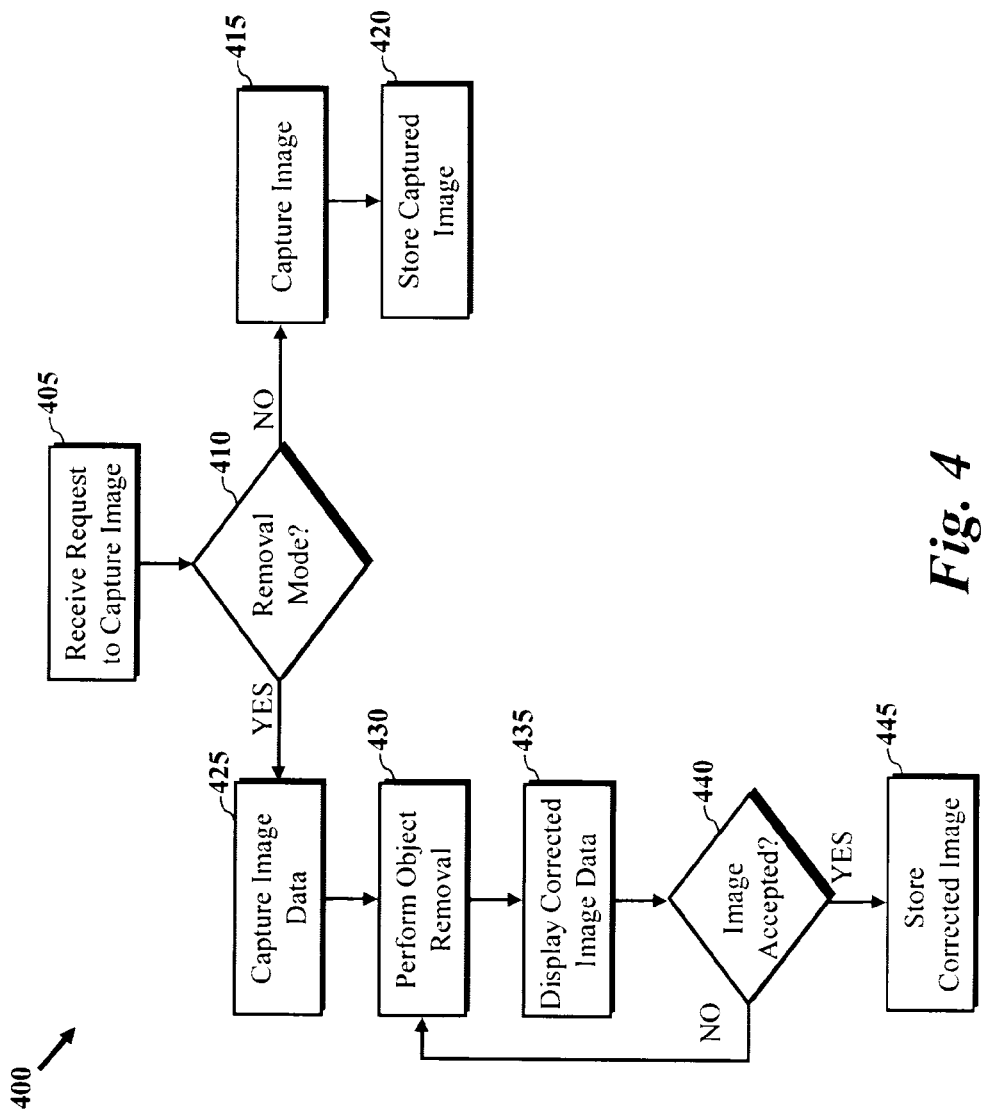
FIG. 4 depicts a process for removal of an undesired object from image data according to another embodiment of the invention.

Referring now to FIG. 4, a process is depicted for removal of an undesired object from image data according to one or more embodiments of the invention. Process 400 may allow for on the spot correction and may further allow for user selection of one or more corrected images. In that fashion, a user can accept or reject a corrected image. Process 400 may be employed by the device of FIG. 1. Process 400 may be initiated by receiving a request to capture image data at block 405. Based on the request, the device may check to determine if a removal mode has been selected by the user. For example, the removal mode may be selected by a button of the I/O interface (e.g., I/O interface 115) or a menu selection of the imaging device. When the removal mode has not been selected (e.g., "NO" path out of decision block 410) the device captures image data at block 415 and stores the captured image data at block 420. When the removal mode has been selected (e.g., "YES" path out of decision block 410), the device may capture a first image data at block 425. Image data captured at block 425 may be for a first frame and a second frame. According to one embodiment, data captured for the second frame may be captured shortly following the capture of the first frame. Based on image data captured at block 425, the device may perform object removal at block 430. Object removal may be based on detecting one or more motion vectors associated with one or more objects in the frame.

Process 400 may display corrected image data at block 435. In one embodiment, display of corrected image data may include display of the corrected image. According to another embodiment, a plurality of images may be displayed to provide one or more corrected images for a user to select as will be described below in more detail with respect to FIG. 5 below. Based on the corrected image data, the user may accept the image data and/or request correction of the image data. The device can check for user acceptance at block 440. For example, the device may display a message requesting user acceptance and storage of the corrected image. When corrected image data is not accepted (e.g., "NO" path out of decision block 440), the device may then capture image data at block 425, perform object removal at block 430 based on the additional image data, and display the corrected image data at 435. Capturing additional image data may provide a more accurate estimation of the static background of a scene. In certain embodiments, the display device may display a message that informs the user to retry image capture. When the image is accepted by the user (e.g., "YES" path out of decision block 440), the device may store the corrected image data.

In contrast to prior art solutions which require memory to store a plurality of images solely for the purpose of tourist removal upon access to an off-line tourist removal tool, one advantage of the invention may be determining if an object removal correction is satisfactory to a user prior to post-processing, or offline handling of image data, using image editing tools. For example, if the result of corrected image data is unsatisfactory, which is not always an option, the user will have to repeat the capturing sequence to obtain data for a post-processing editing tool or perform another offline object removal correction. In contrast, methods and devices described herein allow for the user to view corrected image data in practically real-time, such that additional image data may be detected while on location. As a result, the processing methods described herein can save memory of the imaging device, such as a removable flash memory, for storage of additional image data.

Figure 5:
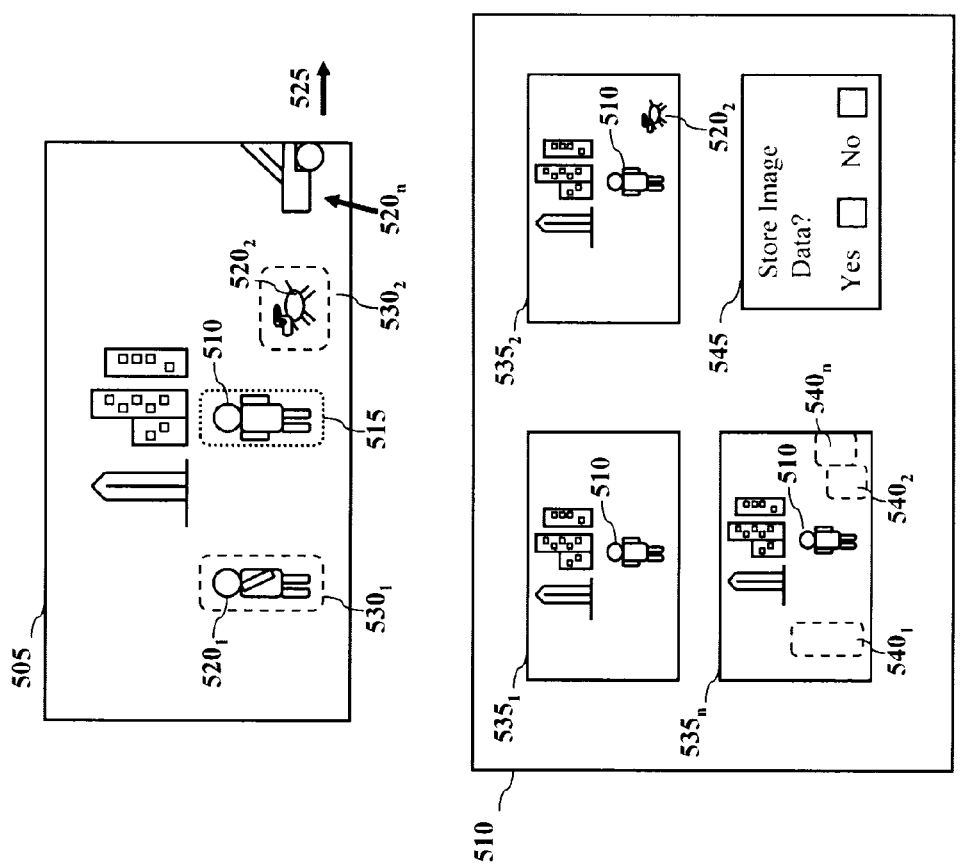
FIG. 5 depicts a graphical representation of removal of an undesired object from image data according to another embodiment of the invention.

Referring now to FIG. 5, a graphical representation is depicted of an image detection window and display of corrected image related to the image capture window according to one or more embodiments. Image detection window 505 depicts an image frame which may be captured by the device of FIG. 1. Detection window 505 can relate to a user view finder of the device or a display which the user may employ to capture image data. As depicted in display window 505, the user may be directed at capturing image data of object 510 including additional image data associated with the frame shown as $520_{1-n}$. In one embodiment of the invention, the device may be configured to display one or more indicators which may be used by a user to identify one or more desired objects. As such, display window 505 may include target identifier 515. Based on the target region, the device may determine on or more undesired objects, shown as $520_{1-n}$. In certain embodiments, the device may be configured to display identifiers $530_{1-n}$ associated with one or more moving objects which may be undesirable. For certain objects which may be fast moving, such as $520_n$, the display window may not display an identifier. For example, object $520_n$ relates to a fast moving object moving out of the frame as shown by direction 525.

Based on the image data captured for the display window 505, such as first and second frames, the device may perform object removal (e.g., block 430) and display corrected image data (e.g., block 435) for user review. In one embodiment, the device may autonomously select a resultant image for display. Alternatively, or in combination, the device may display a plurality of images for user review. Display window 510 relates to a display window of the imaging device including one or more corrected images $535_{1-n}$ associated with image data captured for display window 505. Corrected image $535_1$ relates to a corrected image data including desired object 510 and removal of undesired objects $520_{1-n}$. Corrected image $535_2$ relates to a corrected image data including desired object 510 and removal of undesired objects $520_1$ and $520_n$. In certain embodiments, the device may be configured to include an undesired object with the desired object. Corrected image $535_n$ relates to a corrected image data including desired object 510 and identifiers, shown as $540_{1-n}$, indicating regions where image data has been replaced. In that fashion, a user may be provided an indication of one or more objects which have been replaced. According to another embodiment of the invention, display window 510 may further include a displayed button, shown as 545, which may be selected by the user to perform another correction. Based on user selection of button 545 the device may generate one or more corrected images for display. In certain embodiments, the device may then display a message to a user that additional corrections may not be applied. For example, in certain instances where object data may not be replaced, the device may indicate that additional image data is required, and/or that image data could not be corrected. As such, the user may store corrected image data. According to another embodiment, the device may store uncorrected image data when corrected image data is not accepted.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for removal of undesired objects from image data by an image detection device, wherein the image detection device is operative to perform the method comprising the acts of:
    detecting an amount of movement in image data during a preview mode;
    detecting image data for a first frame;
    detecting image data for a second frame, wherein a duration between detecting image data for the first and second frames is based on at least the detected amount of movement in the preview mode and detecting a type of physical support currently being used for supporting the image detection device;
    detecting motion of an undesired object based, at least in part, on image data for the first and second frames;
    replacing image data of the first frame with image data of the second frame to generate corrected image data, wherein the undesired object is removed from the corrected image data; and
    storing the corrected image data.

2. The method of claim 1, wherein detecting the undesired object is based on detection of motion vectors of the image data of the first frame relative to the second frame.

3. The method of claim 1, wherein the undesired object is present in each of the first and second frames.

4. The method of claim 1, wherein the image data for the second frame is detected following a time delay of the first image.

5. The method of claim 1, further comprising aligning the first and second frames, and generating a difference image based on the aligned image data, wherein detecting motion is based on the difference image.

6. The method of claim 1, wherein replacing image data is based on user selection of a target region.

7. The method of claim 1, further comprising displaying a target associated with objects desired for capture by the image detection device.

8. The method of claim 1, further comprising displaying corrected image data by the image detection device for user review.

9. The method of claim 8, further comprising displaying one or more identifiers indicating regions associated with image correction.

10. The method of claim 1, further comprising displaying the corrected image data for a user, wherein the corrected image data includes one or more images generated based on one or more undesired objects.

11. The method of claim 1, further comprising detecting image data for at least one additional frame, wherein detecting motion is further based on image data of the at least one additional frame.

12. An image detection device configured for removal of undesired objects from image data, the device comprising:
    an image sensor configured to detect image data for first and second frames;
    a memory; and
    a processor coupled to the memory and the image sensor wherein processor is configured to:
        detecting an amount of movement in image data during a preview mode;
        receive image data for a first frame;
        receive image data for a second frame, wherein a duration between receiving image data for the first and second frames is based on at least the detected amount of movement in the preview mode and detecting a type of physical support currently being used for supporting the image detection device;
        detect motion of the undesired object based, at least in part, on image data for the first and second frames;
        replace image data of the first frame with image data of the second frame to generate corrected image data, wherein the undesired object is removed from the corrected image data;
    and store the corrected image data.

13. The device of claim 12, wherein the processor is configured to detect the undesired object based on detection of motion vectors of the image data of the first frame relative to the second frame.

14. The device of claim 12, wherein the undesired object is present in each of the first and second frames.

15. The device of claim 12, wherein the image data for the second frame is detected following a time delay of the first image.

16. The device of claim 12, wherein the processor is configured to
   align the first and second frames, and
   generate a difference image based on the aligned image data, wherein motion is detected based on the difference image.

17. The device of claim 12, wherein the processor is configured to replace image data based on user selection of a target region.

18. The device of claim 12, wherein the processor is further configured to display a target associated with objects desired for capture by the image detection device.

19. The device of claim 12, wherein the processor is further configured to display corrected image data by the image detection device for user review.

20. The device of claim 19, wherein the processor is further configured to display one or more identifiers indicating regions associated with image correction.

21. The device of claim 12, wherein the processor is further configured to display the corrected image data for a user, wherein the corrected image data includes one or more images generated based on one or more undesired objects.

22. The device of claim 12, wherein the processor is further configured to detect image data for at least one additional frame and detect motion based on image data of the at least one additional frame.

* * * * *

UNITED STATES PATENT AND TRADEMARK OFFICE
CERTIFICATE OF CORRECTION

| | | |
|---|---|---|
| PATENT NO. | : 8,615,111 B2 | |
| APPLICATION NO. | : 12/756937 | |
| DATED | : December 24, 2013 | |
| INVENTOR(S) | : Haim Garten | |

It is certified that error appears in the above-identified patent and that said Letters Patent is hereby corrected as shown below:

In the Specification

In Column 7, Line 16, delete "Display window 510" and insert -- Display window 505 --, therefor.

In Column 7, Line 31, delete "display window 510" and insert -- display window 505 --, therefor.

Signed and Sealed this
Third Day of June, 2014

Michelle K. Lee
*Deputy Director of the United States Patent and Trademark Office*